US012369145B2

(12) United States Patent
Shao et al.

(10) Patent No.: US 12,369,145 B2
(45) Date of Patent: Jul. 22, 2025

(54) SYSTEMS AND METHODS FOR RESOURCE CONFIGURATION ENHANCEMENT

(71) Applicant: ZTE CORPORATION, Guangdong (CN)

(72) Inventors: Shijia Shao, Shenzhen (CN); Bo Gao, Shenzhen (CN); Shujuan Zhang, Shenzhen (CN); Zhen He, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 421 days.

(21) Appl. No.: 17/950,794

(22) Filed: Sep. 22, 2022

(65) Prior Publication Data

US 2023/0232389 A1    Jul. 20, 2023

Related U.S. Application Data

(63) Continuation of application No. PCT/CN2021/092939, filed on May 11, 2021.

(51) Int. Cl.
*H04W 4/00* (2018.01)
*H04W 24/08* (2009.01)
(Continued)

(52) U.S. Cl.
CPC ......... *H04W 72/046* (2013.01); *H04W 24/08* (2013.01); *H04W 72/232* (2023.01)

(58) Field of Classification Search
CPC . H04W 72/046; H04W 24/08; H04W 72/232; H04B 7/024; H04B 7/0695;
(Continued)

(56) References Cited

U.S. PATENT DOCUMENTS

| 10,813,157 B1 | 10/2020 | Bai et al. |
| 11,102,039 B2 * | 8/2021 | Zhang ............... H04L 27/26025 |

(Continued)

FOREIGN PATENT DOCUMENTS

| CN | 109802794 A | 5/2019 |
| CN | 111345090 A | 6/2020 |

(Continued)

OTHER PUBLICATIONS (Moderator) Huawei et al., "Summary of CSI enhancements for MTRP and FDD (Round 4)", 3GPP TSG RAN WG1 Meeting #104bis-e, R1-2103965, Apr. 20, 2021, e-Meeting (5 pages).

(Continued)

*Primary Examiner* — Thai Dinh Hoang
(74) *Attorney, Agent, or Firm* — Foley & Lardner LLP

(57) ABSTRACT

A wireless communication device may receive a configuration of at least one radio resource control (RRC) parameter for X channel measurement reference signal (CMR) resource sets or X CMR resource subsets of CMRs from a corresponding set of CMR resources. The parameter X can be an integer greater than 1. The wireless communication device may measure channel quality for at least one CMR resource of the X CMR resource sets or the X CMR resource subsets according to the configuration. The wireless communication device may send a report including at least one of a CMR index or channel quality to the wireless communication node. The report may include at least one of: a CMR index, or a channel quality.

17 Claims, 10 Drawing Sheets

1000

Apply a new beam to signal after 28 symbols from a last symbol of a PDCCH reception, according to a smallest subcarrier spacing of a response receiving cell and at least a first cell

(51) Int. Cl.
*H04W 72/044* (2023.01)
*H04W 72/232* (2023.01)

(58) Field of Classification Search
CPC . H04B 7/088; H04L 27/26025; H04L 5/0023; H04L 5/0053; H04L 5/0094; H04L 27/2602; H04L 27/2613; H04L 5/0048
See application file for complete search history.

(56) References Cited

U.S. PATENT DOCUMENTS

| | | | | |
|---|---|---|---|---|
| 11,632,203 | B2* | 4/2023 | Zhang | H04L 5/0007 375/260 |
| 2016/0352551 | A1* | 12/2016 | Zhang | H04L 5/0007 |
| 2020/0076711 | A1* | 3/2020 | Li | H04L 43/045 |
| 2023/0144011 | A1* | 5/2023 | Bai | H04W 76/19 370/216 |
| 2023/0354275 | A1* | 11/2023 | Moon | H04W 74/0808 |

FOREIGN PATENT DOCUMENTS

| | | | | |
|---|---|---|---|---|
| CN | 112583462 | A | 3/2021 | |
| VN | 10028807 | B * | 7/2021 | H04L 27/2602 |

OTHER PUBLICATIONS

Ericsson, "CSI enhancements for Multi-TRP and FR1 FDD reciprocity", 3GPP TSG-RAN WG1 Meeting #104-bis, R1-2103543, Apr. 20, 2021, Online (17 pages).
Intel Corporation, "On CSI enhancements for MTRP and FDD", 3GPP TSG RAN WG1 #105-e, R1-2104893, May 27, 2021, e-Meeting (17 pages).
Interdigital Inc., "Further Discussion on CSI Enhancements for NCJT MTRP", 3GPP TSG RAN WG1 #104b-e, R1-2102438, Apr. 20, 2021, e-Meeting (5 pages).
Interdigital Inc., "Views on CSI Enhancements for NCJT MTRP", 3GPP TSG RAN WG1 #105-e, R1-2104296, May 27, 2021, e-Meeting (6 pages).
Lenovo et al., "CSI enhancements for multi-TRP and FDD reciprocity", 3GPP TSG RAN WG1 #105-e, R1-2105762, May 27, 2021, e-Meeting (18 pages).
Mediatek Inc., "CSI enhancement for NCJT and FR1 FDD reciprocity", 3GPP TSG RAN WG1 #105e, R1-2105368, May 27, 2021, e-Meeting (12 pages).
Qualcomm Incorporated, "CSI enhancements: MTRP and FR1 FDD reciprocity", 3GPP TSG RAN WG1 #104bis-e, R1-2103156, Apr. 20, 2021, e-Meeting (17 pages).
Vivo, "Further discussion and evaluation on Multi-TRP CSI and partial reciprocity", 3GPP TSG RAN WG1 #105-e, R1-2104347, May 27, 2021, e-Meeting (34 pages).
ZTE, "CSI enhancements for Multi-TRP and FR1 FDD reciprocity", 3GPP TSG RAN WG1 #105-e, R1-2104589, May 27, 2021, e-Meeting (15 pages).
Extended European Search Report for EP Appl. No. 21941224.4, dated May 14, 2024 (9 pages).
ZTE, "Maintenance of multi-beam operation", 3GPP TSG RAN WG1 Meeting #104-e, R1-2100279, Feb. 5, 2021, e-Meeting (3 pages).
ZTE, "Maintenance of multi-beam operation", 3GPP TSG RAN WG1 Meeting #104b-e, R1-2102657, Apr. 20, 2021, e-Meeting (4 pages).
Asia Pacific Telecom, "Maintenance for Beam Failure Recovery 1" 3GPP TSG-RAN WG1 Meeting #96, R1-1903469, Mar. 1, 2019, Athens, Greece (14 pages).
International Search Report and Written Opinion for PCT Appl. No. PCT/CN2021/092939, mailed Feb. 10, 2022 (9 pages).
Moderator (Apple), "Feature Lead Summary on L1-SINR and SCell BFR" 3GPP TSG RAN WG1 #101, R1-2004709, Jun. 5, 2020, e-Meeting (15 pages).

* cited by examiner

100: wireless communication network
101: geographical area
102: BS
104: UE
110: communication link
118, 124: radio frame
120, 127: sub-frame
122, 128: data symbols
126, 130, 132, 134, 136, 138, 140: cell

| | Group 0 | | Group 1 | | |
|---|---|---|---|---|---|
| | CMR 1 | CMR 2 | CMR 3 | CMR 4 | CMR 5 |
| | 1 | | 1 | 1 | 0 |
| | 1 | | 0 | 1 | 1 |

| | Group 1 | | | Group 0 | |
|---|---|---|---|---|---|
| | CMR 3 | CMR 4 | CMR 5 | CMR 1 | CMR 2 |
| CMR 1 | 1 | 1 | 0 | 0 | 1 |
| CMR 2 | 0 | 1 | 1 | 0 | 0 |
| Group 0 | | | | | |

FIG. 5

| | Group 0 | | Group 1 | | |
|---|---|---|---|---|---|
| | CMR 1 | CMR 2 | CMR 3 | CMR 4 | CMR 5 |
| | 1 | 1 | 1 | 1 | 0 |
| | 0 | 0 | 0 | 1 | 1 |

FIG. 6

| Group 0 | | Group 1 | | |
|---|---|---|---|---|
| CMR 1 | CMR 2 | CMR 3 | CMR 4 | CMR 5 |
| 1 | 0 | 1 | 1 | 0 |

1002: Apply a new beam to signal after 28 symbols from a last symbol of a PDCCH reception, according to a smallest subcarrier spacing of a response receiving cell and at least a first cell

FIG. 10

SYSTEMS AND METHODS FOR RESOURCE CONFIGURATION ENHANCEMENT

CROSS-REFERENCE TO RELATED APPLICATION

This application claims the benefit of priority under 35 U.S.C. § 120 as a continuation of PCT Patent Application No. PCT/CN2021/092939, filed on May 11, 2021, the disclosure of which is incorporated herein by reference in its entirety.

TECHNICAL FIELD

The disclosure relates generally to wireless communications, including but not limited to systems and methods for channel measurement and beam management.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a configuration of at least one radio resource control (RRC) parameter for X channel measurement reference signal (CMR) resource sets or X CMR resource subsets of CMRs from a corresponding set of CMR resources. The parameter X can be an integer greater than 1. The wireless communication device may measure channel quality for at least one CMR resource of the X CMR resource sets or the X CMR resource subsets according to the configuration. The wireless communication device may send a report including at least one of a CMR index or channel quality to the wireless communication node. The report may include at least one of: a CMR index, or a channel quality.

In some implementations, the configuration can include a plurality of parameters each for one or more CMR resource sets of the X CMR resource sets or one or more CMR resource subsets of the X CMR resource subsets. Each of the plurality of parameters can be set to a same value across the one or more CMR resource sets of the X CMR resource sets or the one or more CMR resource subsets of the X CMR resource subsets. In some implementations, the configuration can include a plurality of parameters each for one or more CMR resource sets of the X CMR resource sets or one or more CMR resource subsets of the X CMR resource subsets. Each parameter of the plurality of parameters can be set to different values across the one or more CMR resource sets or the one or more CMR resource subsets. The at least one RRC parameter can includes at least one of a repetition parameter, an aperiodic triggering offset (aperiodicTriggeringOffset) parameter or a tracking reference signal information (Trs-Info) parameter.

In some implementations, receiving the configuration of the at least one RRC parameter for the X CMR resource sets or the X CMR resource subsets can include the wireless communication device receiving a separate set of configuration for each of the X CMR resource sets or the X CMR resource subsets. In some implementations, receiving the configuration of the at least one RRC parameter for the X CMR resource sets or the X CMR resource subsets can include at least one of (i) the wireless communication device receiving a first set of one or more RRC parameters associated with a first CMR resource set of the X CMR resource sets or with a first CMR resource subset of the X CMR resource subsets, to be applied to at least one of the X CMR resource sets or the X CMR resource subsets, or (ii) the wireless communication device receiving a second set of one or more RRC parameters associated with a second CMR resource of the X CMR resource sets or with a second CMR resource subset of the X CMR resource subsets, to be applied to the second CMR resource set or the second CMR resource subset. The wireless communication device can receive a reference parameter in the second set of one or more RRC parameters to indicate one or more first values of the first set of one or more RRC parameters, to be applied to the second CMR resource set or the second CMR resource subset.

In some implementations, receiving the configuration of the at least one RRC parameter can include the wireless communication device receiving at least a first RRC parameter for use to indicate a division of the corresponding set of CMR resources into the X CMR resource subsets. The at least a first RRC parameter can include at least one of (i) a resource division parameter to indicate at least one of: whether to divide the corresponding set of CMR resources into the X CMR resource subsets using a default method, or (ii) a resource division mode parameter to indicate one of a plurality of methods for dividing the corresponding set of CMR resources into the X CMR resource subsets.

In some implementations, receiving the configuration of the at least one RRC parameter can include the wireless communication device receiving X CMR resource lists. Each of the X CMR resource lists can correspond to a CMR resource subset.

In some implementations, the wireless communication device can select the X CMR resource sets from Y CMR resource sets based on a RRC signaling, or select the X CMR resource subset from Y CMR resource subsets based on the RRC signaling. The parameter Y can be an integer greater than X. In some implementations, the wireless communication device can select the X CMR resource sets from Y CMR resource sets based on a bitmap configured in a downlink control information (DCI), or select the X CMR resource subset from Y CMR resource subsets based on the bitmap configured in the DCI.

In some implementations, the wireless communication device can (i) select Z CMR resource sets from Y CMR resource sets based on a RRC signaling, and select the X CMR resource sets from the Z CMR resource sets based on a bitmap configured in a downlink control information (DCI), or (ii) select Z CMR resource subsets from Y CMR resource subsets based on the RRC signaling, and select the X CMR resource subsets from Z the CMR resource subsets based on the bitmap configured in DCI. The parameter Y can be an integer greater than Z. In some implementations, the configuration can include a periodicity and offset (periodicityAndOffset) parameter defining a CMR resource periodicity and a slot offset. The CMR resource periodicity can be the same for all CMR resources of the X CMR resource sets or X CMR resource subsets.

At least one aspect is directed to a system, method, apparatus, or a computer-readable medium. A wireless communication node may configure configuration of at least one radio resource control (RRC) parameter for X channel measurement reference signal (CMR) resources sets or X CMR resources subsets from a CMR resource set. The parameter X can be an integer greater than 1. The wireless communication node may send, to a wireless communication device, the configuration of the at least one RRC parameter for configuring the wireless communication device for measurement of at least one CMR resource corresponding to the X CMR resource sets or the X CMR resources subset.

At least one aspect is directed to a system, method, apparatus, or a computer-readable medium. A wireless communication device may apply a new beam to a signal after 28 symbols from a last received symbol of a physical downlink control channel (PDCCH), according to a smallest subcarrier spacing of a response receiving cell and at least a first cell.

In some implementations, the at least a first cell can include at least one of each failed cell or all failed cells. A cell of the at least a first cell can be determined to be a failed cell upon the wireless communication device detecting one or more beam failures each of which is detected based on a beam failure detecting reference signal resource set (BFD-RS set) configured on the cell for a link. The all failed cells can be associated with a same link. The link can include at least one of CORESETpoolIndex, transmission reception points (TRP), beam failure detecting reference signal resource set (BFD-RS set) or TRP-ID.

In some implementations, the new beam can include a reference signal (RS) from a new candidate beam indication reference signal resource set (NBI-RS set) with corresponding link quality that is larger than or equal to a threshold. The signal can include at least one of PDCCH monitoring using a same antenna port quasi co-location parameters as the RS, or PUCCH transmitting, using a same spatial domain filter as the RS.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 3-5 illustrate example approaches for determining CMR pairs from one or more CMR groups, in accordance with some embodiments of the present disclosure;

FIG. 6 illustrates example approaches for indicating a CMR pair, in accordance with some embodiments of the present disclosure;

FIG. 7 illustrates example approaches for indicating a STRP measurement, in accordance with some embodiments of the present disclosure;

FIG. 10 shows a flowchart illustrating a method for beam failure recover, according to example embodiments of the current disclosure.

DETAILED DESCRIPTION

1. Mobile Communication Technology and Environment

Figure 1:
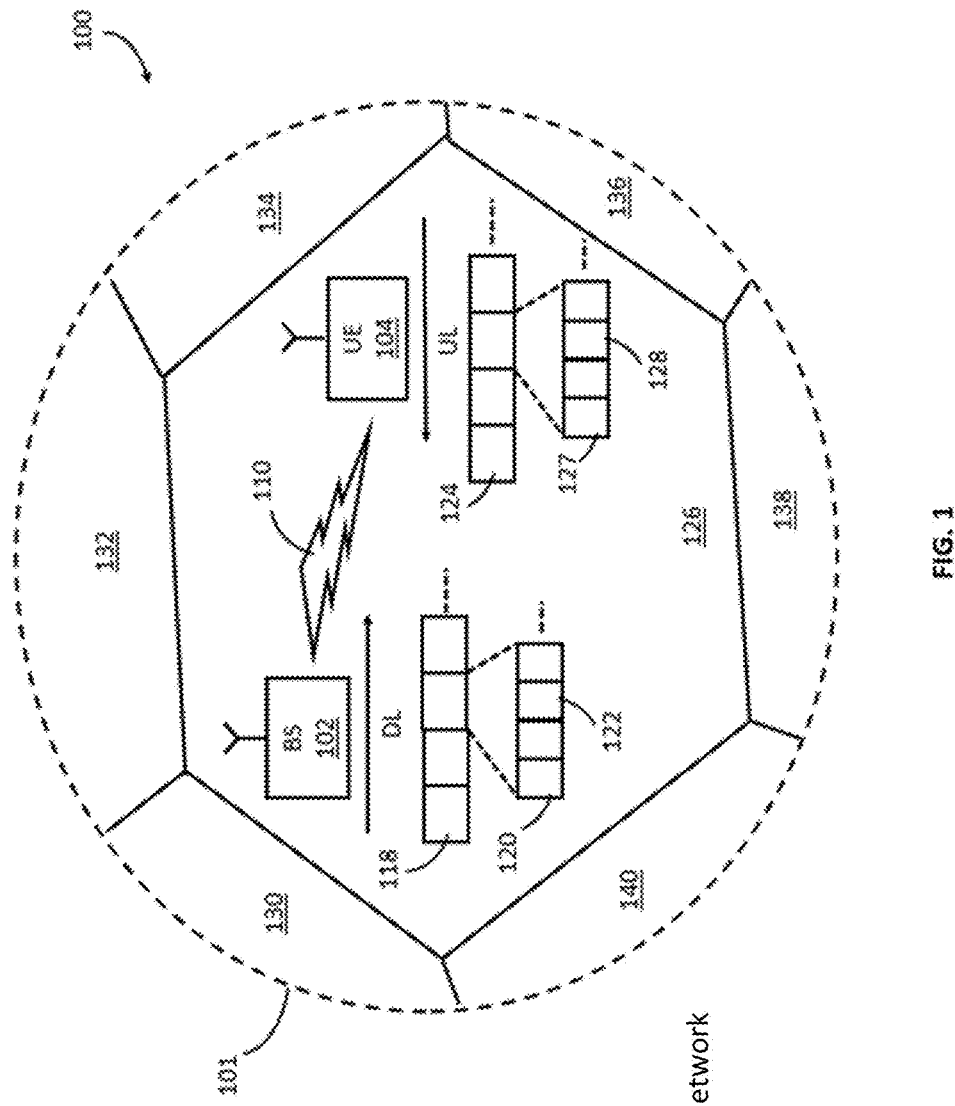
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
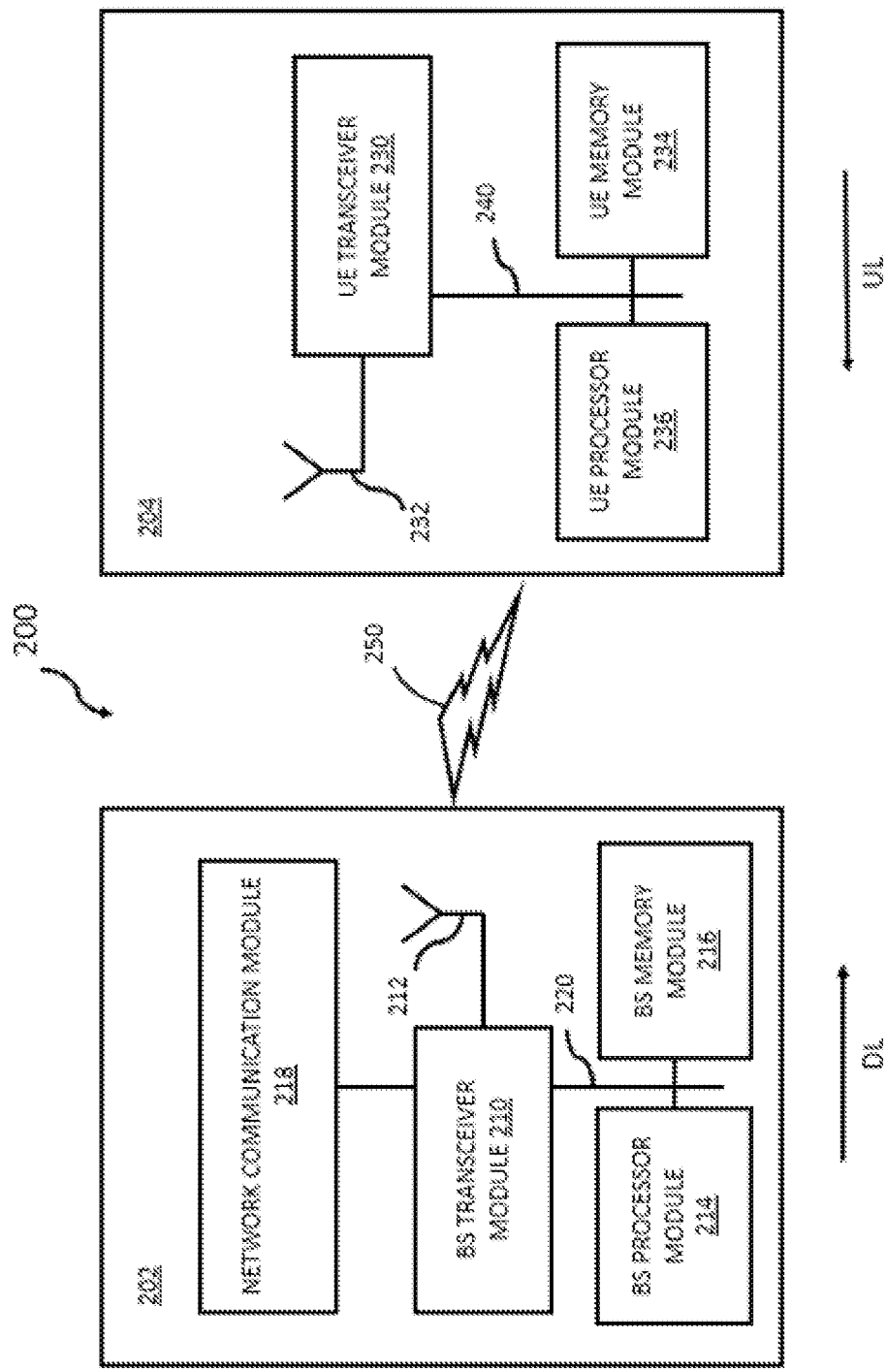
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Enhancing Resource Configuration

In certain systems (e.g., 5G new radio (NR), next generation (NG) systems, and/or other systems), multiple transmission and reception points (MTRP) technology may improve/enhance coverage at the edge of a cell and/or reduce the negative impact of a blocking effect. With the standardization of MTRP technology, procedures/approaches to enhance downlink (DL) transmissions are gradually becoming stable. However, current procedures/approaches for enhancing uplink (UL) transmissions are far from stable. In certain scenarios, a wireless communication device (e.g., a UE, a terminal, and/or a served node) may have multi-panel transmission capability. If the wireless communication device has multi-panel transmission capability, solutions for channel state information (CSI) feedback and/or group-based reporting in beam management can be further assessed.

The systems and methods presented herein consider a multi-panel simultaneous transmission capability of the wireless communication device. In addition, the systems and methods include one or more grouping/pairing approaches for measurement reference signals (RSs) on the side of the wireless communication node (e.g., a central processing unit (CPU), a ground terminal, a base station, a gNB, an eNB, a transmission-reception point (TRP), a network (NW), or a serving node), as well as a report format at the wireless communication device side (e.g., after receiving an indication). Specifically, one or more of the following issues/problems can be considered.

The wireless communication node may indicate/specify/inform/report (e.g., to the wireless communication device) the measurement resources used for single transmission and reception point (STRP) transmissions, the measurement resources used for MTRP transmissions, and/or the resources that need to be received by the wireless communication device at the same time. The wireless communication device may report/inform/provide the measurement information after receiving/obtaining an instruction from the wireless communication node. For example, the measurement information may include measurement resource indexes, measurement results, and/or other information.

A MTRP approach can use multiple transmission and reception points (TRPs) to effectively improve/enhance the throughput of transmissions in certain systems (e.g., Long Term Evolution (LTE), Long Term Evolution-Advanced (LTE-A), and/or new radio access technology (NR) in an enhanced mobile broadband (eMBB) scenario). Using MTRP transmissions and/or receptions can effectively reduce/decrease the probability of information blockage, and/or improve/enhance the reliability of transmissions in certain scenarios (e.g., ultra-reliability and low latency communication (URLLC) scenarios).

According to (or based on) the mapping/relationship/association between a transmitted signal flow and a multi-TRP/panel, multiple coordinated points of transmission/reception can be divided/categorized/organized/classified into at least two types. The at least two types can include coherent transmissions and/or non-related transmissions. For coherent transmissions, each data layer can be mapped to a multi-TRP/panel through weighted vectors. However, coherent transmissions may have higher/stricter requirements for synchronization between TRPs and/or for the transmission capability of backhaul links. Furthermore, coherent transmissions can have increased sensitivity to a plurality of non-ideal factors.

Non-coherent joint transmissions (NCJT) may be less affected by (or susceptible to) the above factors. Therefore, NCJT may be used in certain systems (e.g., R15) to coordinate multiple points of transmission/reception. In NCJT, each data flow can be mapped/related to a port. The port may correspond to the TRP/panel with same channel large-scale parameters (QCL). In some embodiments, different/separate/distinct data flows can be mapped to different ports with different large-scale parameters. All TRPs may not be processed as a virtual array.

Figure 3:
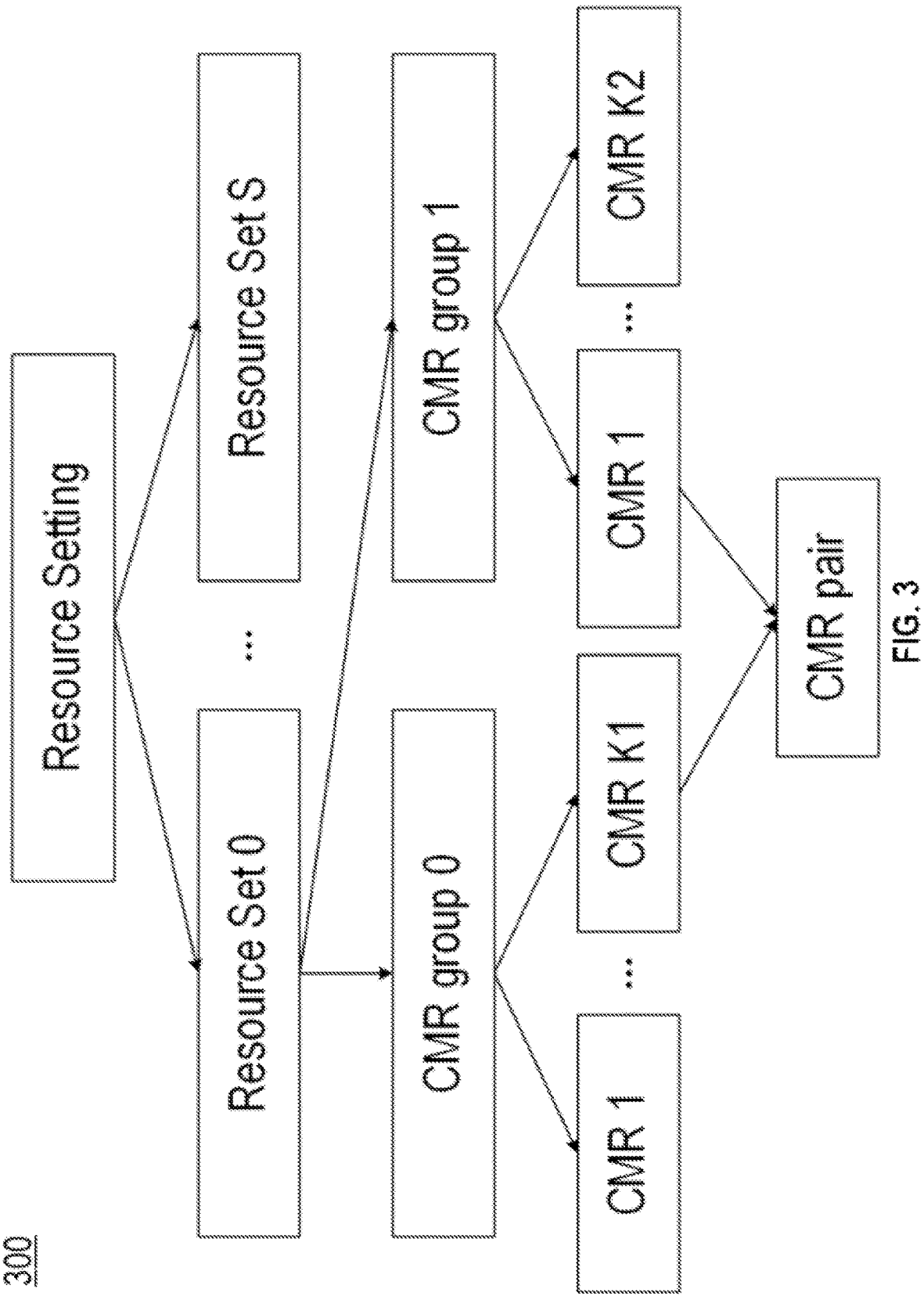

In certain systems (e.g., Rel-17), one or more rules for CSI reporting in a MTRP scenario can be defined/configured. For CSI measurements associated with, or related to, a reporting setting (e.g., CSI-ReportConfig and/or other settings) for NCJT, the wireless communication device can be configured with Ks≥2 non-zero-power (NZP) CSI reference signal (CSI-RS) resources in a CSI-RS resource set for a channel measurement resource (CMR), and/or N≥1 NZP CSI-RS resource pairs. Each pair may be used for a NCJT measurement hypothesis. As illustrated in FIG. 3, the wireless communication device can be configured with at least two CMR groups having K1 and K2 CMRs, respectively, with Ks=K1+K2 CMRs. CMR pairs may be determined from the at least two CMR groups by following a detailed configuration method.

For beam measurements in a plurality of simultaneous MTRP transmissions, the wireless communication device may report/specify/indicate a single CSI report. The CSI report may include N beams pairs/groups and/or M (M>1) beams per pair/group. Different/separate/distinct beams within a pair/group can be received/obtained simultaneously.

In some embodiments, a beam may correspond/refer to a quasi-co-location (QCL) state, a transmission configuration indicator (TCI) state, a spatial relation state (or spatial relation information state), a reference signal (RS), a spatial filter, and/or pre-coding. Specifically:
  a) A transmit (Tx) beam may correspond/refer to a QCL state, a TCI state, a spatial relation state, a downlink/uplink (DL/UL) reference signal (e.g., channel state information reference signal (CSI-RS), synchronization signal block (SSB) (also called SS/PBCH), demodulation reference signal (DMRS), sounding reference signal (SRS), and/or physical random access channel (PRACH)), a Tx spatial filter, and/or Tx pre-coding.
  b) A receive (Rx) beam may correspond/refer to a QCL state, a TCI state, a spatial relation state, a spatial filter, a Rx spatial filter, and/or Rx precoding.
  c) A beam identifier (ID) may correspond/refer to a QCL state index, a TCI state index, a spatial relation state index, a reference signal index, a spatial filter index, a precoding index, and/or other indices.

The spatial filter may correspond to the perspective of the wireless communication device and/or the wireless communication node. The spatial filter may refer to a spatial-domain filter and/or other filters. A spatial relation information may comprise one or more reference RSs. The spatial relation information may be used to specify/indicate/convey/represent the spatial relation between a targeted RS/channel and the one or more reference RSs. A spatial relation may refer to same/quasi-co beam(s), same/quasi-co spatial parameter(s), and/or same/quasi-co spatial filter(s). A spatial relation may include or correspond to a beam, spatial parameter, and/or spatial domain filter.

A QCL state may comprise one or more reference RSs and/or one or more corresponding QCL type parameters. The QCL type parameters may include at least one of: a Doppler spread, a Doppler shift, a delay spread, an average delay, an average gain, and/or a spatial parameter (e.g., a spatial Rx parameter). A TCI state may correspond/refer to a QCL state. A QCL Type A may include a Doppler shift, a Doppler spread, an average delay, and/or a delay spread. A QCL Type B may include a Doppler shift and/or Doppler spread. A QCL Type C may include a Doppler shift and/or an average delay. A QCL Type D may include a spatial Rx parameter.

A UL signal may include/comprise a PRACH, a physical uplink control channel (PUCCH), a physical uplink shared channel (PUSCH), an UL DMRS, a SRS, and/or other channels/signals. A DL signal may include/comprise a physical downlink control channel (PDCCH), a physical downlink shared channel (PDSCH), a SSB, a DL DMRS, a CSI-RS, and/or other channels/signals. Group based reporting may comprise at least one of beam group based reporting and/or antenna group based reporting. A beam group may specify that different/separate/distinct Tx beams within one group can be simultaneously received and/or transmitted. A beam group may indicate that Tx beams between different groups may not be simultaneously received and/or transmitted. A beam group can be described from the perspective of the wireless communication device.

A CMR may indicate/provide/specify a channel measurement signal/resource. The signal/resource may include or correspond to a CSI-RS, a SS/PBCH block, and/or other signals/resources. An IMR may specify/indicate an interference measurement (IM) signal/resource. The signal/resource may include or correspond to a CSI-RS, CSI-IM, and/or other signals/resources. A panel ID may include or correspond to a UE panel index.

I. Reporting Measurement Results

In some embodiments, the wireless communication device may send/transmit/communicate the report to the wireless communication node 102 or 202 according to (or based on) at least one CMR. The at least one CMR can be configured by a wireless communication node. In some embodiments, the report may include:
  A CMR index, such as:
    One or more indices of CSI-RS, a SS/PBCH block, and/or other signals/resources (e.g., a SRS).
  Channel quality information, such as:
    a reference signal received power (RSRP).
    a signal-to-interference-plus-noise ratio (SINR).
    channel quality information (CQI).
      In some embodiments, the parameters to be reported may depend on a higher-layer configuration.

II. Configuring CMR Sets/Subsets

The wireless communication device 104 or 204 may measure/assess the channel according to (or based on) a CMR in the configured CMR resource set. To enhance/improve certain approaches that use NCJT, one or more of the following schemes/options can be considered:
  Configure N CMR resource sets for the wireless communication device 104 or 204 (e.g., N≥2). Each resource set (or each resource group) may be associated/related with a wireless communication node (e.g., TRP).
    The number of resources in different/separate/distinct resource sets may be the same or different.
  Divide/categorize/classify/organize a resource set into N resource subsets (e.g., N≥2).
    Option 1: In some embodiments, M resources may be configured in a resource set. When M resources are configured in a resource set, the first M/N resources can belong to (or are included in) the first subset. The second M/N resources can belong to (or are a part of) the second subset. Therefore, the $j^{th}$ M/N resources can belong to the $j^{th}$ subset.
    Option 2: In some embodiments, M resources may be configured in a resource set. When there are M CMRs in the one resource set, every (k+n*X)-th of the CMRs belongs to (or is a part of) the k-th one of the X subsets. The integer n may assume integer values that are at least zero and/or no greater than ((M/X)−1). For example, M=6 (or other values) resources can be configured in a resource set. If M=6 resources are configured, the resource set may be divided into N=3 resource subsets. The first resource subset may include resources 1 and 4, while the second resource subset can include resources 2 and 5. The third resource subset may include resources 3 and 6.

In some implementations, more than one CMR set may be configured (e.g., aperiodic CSI resource setting). If more than one CMR set is configured, one bitmap can be used to indicate/specify two or more sets from all configured sets, corresponding to multiple TRPs.

In current specifications, for aperiodic CSI resource setting, the number of configured CSI-RS resource sets can be S>1. For example, if S=4, one bit map can be used to select two of the four configured sets (set), corresponding to two TRPs respectively.

III. Configuring CMR Pairs

For a CSI report in the NCJT scenario, the CMR resources that the wireless communication node 102 or 202 instructs the wireless communication device 104 or 204 to receive (independently and/or simultaneously, as a resource pair, for instance) are discussed herein. Based on the description of Configuring CMR Sets/Subsets, a group may include or correspond to the above resource set and/or resource sub-set.

Rule 1: A mapping between group 0 (e.g., a first group) and group 1 (e.g., a second group) may be performed/configured according to (or based on) a bitmap. The wireless communication node 102 or 202 may send/transmit/communicate information of the mapping to the wireless communication device 104 or 204.

1.1: In some implementations, only one bitmap may be used to indicate the pairing/mapping.

1.1.1: CMR pairs may be determined from (or according to) at least two CMR groups (e.g., group 0 and group 1). FIG. 4 depicts an example approach 400 for determining CMR pairs from two CMR groups. If the bitmap is set/configured to "1" (e.g., CMR3 and CMR1), the corresponding CMR pair can be used for MTRP measurements (e.g., for determining a channel quality according to multiple CMRs in the CMR pair). If the CMR is set/configured to "0", the CMR can be used for STRP measurements (e.g., for determining a channel quality according to a single CMR). In some implementations, all resources in group 0 and/or group1 can be used for STRP measurements.

1.1.2: CMR pairs can be determined from (or according to) only one CMR group (e.g., group 0 or group 1). FIG. 5 depicts an example approach 500 for determining CMR pairs from one CMR group and/or from two CMR groups. If the bitmap is set/configured to "1", the corresponding CMR pair can be used for MTRP measurements (e.g., for determining a channel quality according to multiple CMRs in the CMR pair). If the CMR is set/configured to "0", the CMR can be used for STRP measurements (e.g., for determining a channel quality according to a single CMR). In some implementations, all resources in group 0 and/or group1 can be used for STRP measurements.

1.2: In some implementations, two bitmaps may be used to indicate/specify/configure a pairing and/or a STRP measurement respectively.

In some embodiments, the two bitmaps may not be limited to the two bitmaps, but two parts of one bitmap.

FIG. 6 depicts an example approach 600 for indicating a CMR pair. If the bitmap is set/configured to "1", the corresponding CMR pair can be used for MTRP measurements.

FIG. 7 depicts an example approach 700 for indicating a STRP measurement. If the bitmap is set/configured to "1", the corresponding CMR can be used for STRP measurements.

The number of CMR pairs (or CMRs) indicated/specified by the wireless communication node 102 or 202 and/or the number of single CMRs used for STRP measurements (e.g., the number of 1's in the bitmap(s)) may depend on (or be configured according to) the capability of the wireless communication device 104 or 204.

Rule 2: A mapping of a first group (e.g., group 0) and a second group (e.g., group 1) in a predetermined order.

2.1: Configured by (or according to) the wireless communication node 102 or 202.

Group 0 may have M CMRs (e.g., CMR #1, CMR #2, . . . , CMR #M), while group 1 may have N CMRs (e.g., CMR #1, CMR #2, . . . , CMR #N). A parameter S (e.g., S=0.5, 1, 2, . . . ) can be configured by the wireless communication node 102 or 202. A plurality of CMRs in the first group can be mapped/associated/related with a respective CMR in the second group in order (e.g., as CMR pairs for MTRP measurements). The parameter S can specify/indicate the number of CMRs in the first group to be mapped with a CMR in the second group. The case where S=0.5 implies that one CMR in the first group is to be mapped to two CMRs in the second group.

For example, if S=2, CMR #1 and #2 from group 0 can be mapped to CMR #1 in group 1 as CMR pairs, such as {CMR #1 (group 0), CMR #1 (group 1)} and {CMR #2 (group 0), CMR #1 (group 1)}. Furthermore, CMR #3 and #4 from group 0 can be mapped to CMR #2 in group 1 as CMR pairs, such as {CMR #3 (group 0), CMR #2 (group 1)} and {CMR #4 (group 0), CMR #2 (group 1)}.

If M/N>2, the CMRs that can be used for STRP measurements may be as follows:
Option 1: the remaining CMRs in group 0 (e.g., if M=3 and N=1, one CMR remains in group 0)
Option 2: all CMRs (e.g., groups 0 and/or 1)
Option 3: CMRs indicated by a bitmap (e.g., see 1.2: STRP measurement indication).

If M/N<2, the CMRs that can be used for STRP measurements may be as follows:
Option 1: the remaining CMRs in group 1 (or other groups)
Option 2: all CMRs (e.g., groups 0 and/or 1)
Option 3: CMRs indicated by a bitmap (e.g., see 1.2: STRP measurement indication)

If M/N=2, the CMRs that may be used for STRP measurements may be as follows:
Option 2: all CMRs (e.g., groups 0 and/or 1)
Option 3: CMRs indicated by a bitmap (e.g., see 1.2: STRP measurement indication)

2.2: Using a predefined mapping (e.g., the wireless communication node 102 or 202 may not configure the mapping information)

The wireless communication device may determine/configure the matching/mapping relationship in accordance with (or based on) the number of CMRs configured in different/separate groups by the wireless communication node. For instance, the wireless communication device 104 or 204 may determine a respective number of CMRs in the first group to be mapped with a respective CMR in the second group as CMR pairs, in accordance with a number of CMRs configured in the first group and a number of CMRs configured in the second group by the wireless communication node.

For example, group 0 may have M CMRs (e.g., CMR #1, CMR #2, . . . , CMR #M), while group 1 can have N CMRs (e.g., CMR #1, CMR #2, . . . , CMR #N). If M/N=2, CMR #1 and CMR #2 in group 0 can be mapped to CMR #1 in group 1. Furthermore, CMR #3 and CMR #4 in group 0 may be mapped to CMR #2 in group 1. If M/N=1, CMR #1 in group 0 may be mapped to CMR #1 in group 1. Furthermore, CMR #2 in group 0 may be mapped to CMR #2 in group 1.

2.3: Certain embodiments may use/include a match mode (and/or a mode parameter). For instance, the wireless communication device 104 or 204 may receive a mode parameter from the wireless communication node 102 or 202 (e.g., according to a capability of the wireless communication device).

Mode 1: A mode parameter can be configured, according to (or by using) higher layer signaling (e.g., radio resource control (RRC) and/or medium access control control element (MAC-CE) signaling), as a first value (e.g., "enable" and/or "on"). If the mode parameter is configured as the first value, a pairing may be performed/executed in accordance with the systems and methods of 2.1 and/or 2.2.

Mode 2: The mode parameter can be configured, according to higher layer signaling (e.g., RRC and/or MAC-CE signaling), as a second value (e.g., "disable" and/or "off"). If the mode parameter is configured as the second value, every two CMRs in two CMR groups may be paired. For example, group 0 may have CMR #1 and/or CMR #2, while group 1 may have CMR #3 and/or CMR #4. The configured/assembled CMR pairs may include:

Option 1: CMR pairs from the two CMR groups (e.g., different groups). For instance, {CMR #1, CMR #3} {CMR #2, CMR #3}{CMR #1, CMR #4} {CMR #2, CMR #4}.

Option 2: CMR pairs from at least one of the two (e.g., a same) CMR groups (e.g., from one or two CMR groups). For instance, {CMR #1, CMR #3} {CMR #2, CMR #3} {CMR #1, CMR #4}{CMR #2, CMR #4} and {CMR #1, CMR #2} {CMR #3, CMR #4}.

If a plurality of CMR pairs share a common CMR, then other CMRs in the plurality of CMR pairs should be configured with a same quasi co-location (QCL) Type-D or quasi co-located in QCL Type-D.

For example, the CMR pairs may include {CMR #1, CMR #3} {CMR #2, CMR #3}, wherein CMR #3 is common between the pairs. Therefore, the other CMRs (e.g., CMR #1 and/or CMR #2) may be configured with a same/corresponding QCL Type-D and/or QCLed with QCL-Type-D.

IV. Channel Measurement and Beam Management

In order to improve the coverage at the cell edge and reduce the negative impact of the blocking effect, the MTRP technology has become an important technical method in the 5G NR system. With the gradual standardization of MTRP technology, the enhancement of downlink transmission is gradually stable, but the enhancement of uplink is far from being satisfactory. Especially when a UE has the multi-panel transmission capability, CSI feedback solutions and group-based reporting in beam management are to be further considered.

Embodiments described herein are based on the multi-panel simultaneous transmission capability at the UE side. Indicating the reference signal for measurement to the wireless communication device 104 or 204 clarifies the parameter restrictions of configuring multiple measurement resource sets/sub-sets from the wireless communication node 102 or 202 and the parameter design of configuration methods for multiple sets/sub-sets.

Figure 8:
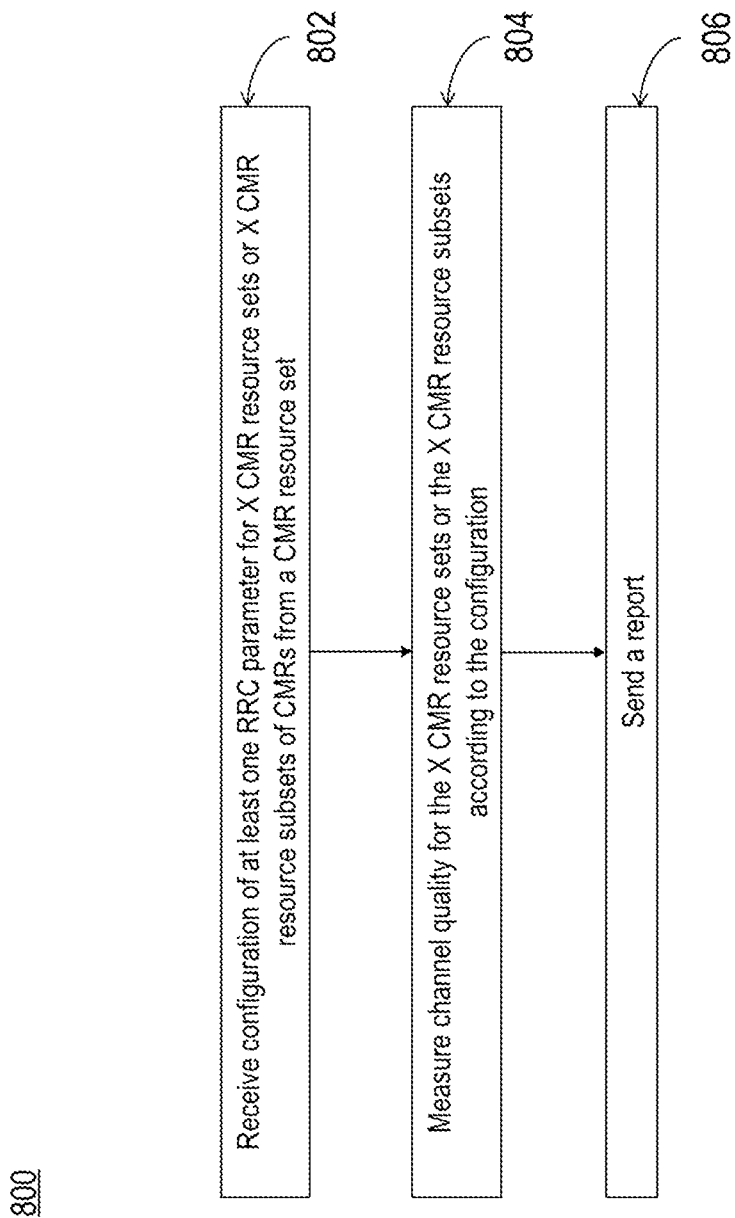
FIG. 8 shows a flow diagram illustrating a method performed by wireless communication device for channel measurement and beam management, according to example embodiments of the current disclosure.

FIG. 8 shows a flow diagram illustrating a method 800 performed by wireless communication device 104 or 204 for channel measurement and beam management, according to example embodiments of the current disclosure. In overview, the method 800 can include the wireless communication device 104 or 204 receiving configuration of at least one radio resource control (RRC) parameter for X CMR resource sets or X CMR resource subsets of CMRs from a CMR resource set (STEP 802). The method 800 can include the wireless communication device 104 or 204 measuring channel quality for the X CMR resource sets or the X CMR resource subsets according to the configuration (STEP 804), and sending a report to the wireless communication node 102 or 202 (STEP 806). The parameter X can be an integer greater than one. The report may include at least one of a CMR index or a channel quality.

Figure 9:
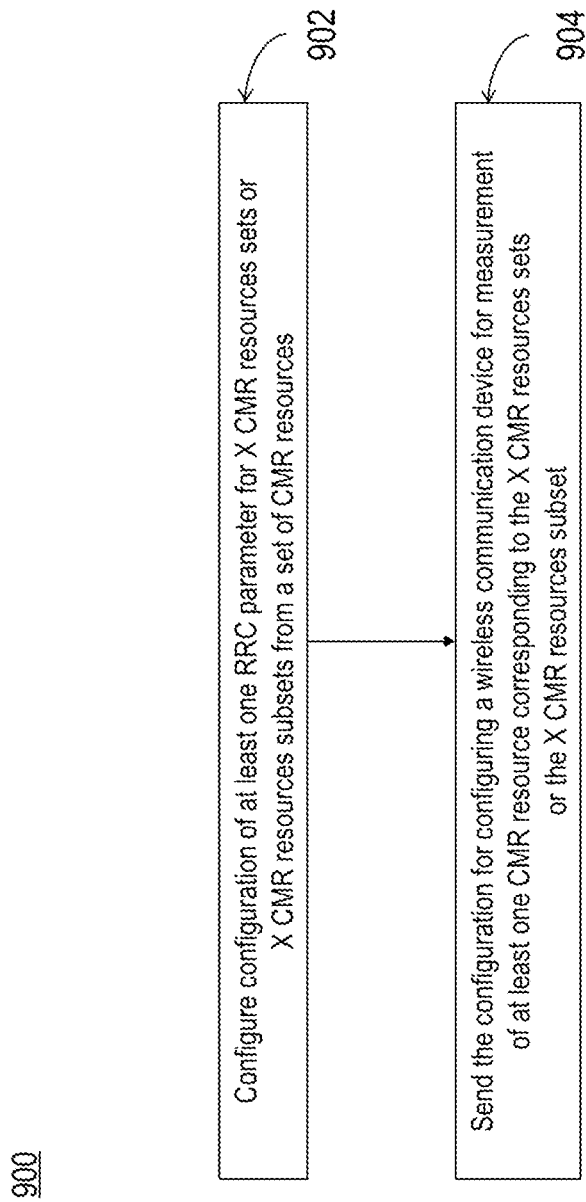
FIG. 9 shows a flow diagram illustrating a method performed by wireless communication node for channel measurement and beam management, according to example embodiments of the current disclosure.

FIG. 9 shows a flow diagram illustrating a method 900 performed by wireless communication node 102 or 202 for channel measurement and beam management, according to example embodiments of the current disclosure. In overview, the method 900 can include the wireless communication node 102 or 202 configuring configuration of at least one radio resource control (RRC) parameter for X CMR resources sets or X CMR resources subsets from a set of CMR resources (STEP 902). The method 900 can include the wireless communication node 102 or 202 sending, to the wireless communication device 104 or 204, the configuration of the at least RRC parameter for configuring the wireless communication device 104 or 204 for measurement of at least one CMR resource corresponding to the X CMR resources sets or the X CMR resources subset. The parameter X can be an integer greater than 1.

Referring now to FIGS. 8 and 9, the wireless communication node may generate the configuration of the at least one RRC parameter (STEP 902), and send/transmit/broadcast/communicate the configuration to the wireless communication device 104 or 204 (STEP 904). The configuration may include an indication of the X CMR resource sets or the X CMR resource subsets and/or other information. For instance, the configuration may include/provide/specify/indicate the X CMR resource sets or X CMR resource subsets and/or reporting instructions. The wireless communication device 104 or 204 may receive/obtain/acquire the configuration from the wireless communication node 102 or 202

(STEP 802), and may determine/identify the X CMR resource sets or the X CMR subsets of the set of CMRs according to the received configuration.

In some implementations, the wireless communication device 104 or 204 may receive/obtain a message comprising a bitmap from the wireless communication node 102 or 202. The wireless communication device 104 or 204 may determine at least one CMR set from the X CMR sets. The wireless communication device 104 or 204 may determine the at least one CMR set according to the bitmap. In some implementations, each of the X CMR subsets may have a respective/corresponding (1/X)-th of resources from the set of CMRs. For example, the resources from the set can be split/organized/divided/partitioned into X portions. Each portion of the X portions may be for or form a corresponding CMR subset. The portion can include or correspond to 1/X of the resources. In some implementations, one resource set may include M CMRs. When there are M CMRs in the one resource set, every (k+n*X)-th of the CMRs may belong to (or be associated with/related to) the k-th CMR subset of the X CMR subsets. The integer n may assume integer values that are at least zero and/or no greater than ((M/X)−1).

The wireless communication device 104 or 204 may determine/identify/configure a mapping. The wireless communication device 104 or 204 may determine the mapping according to (or based on) the configuration received from the wireless communication node 102 or 202. The mapping may include or correspond to a mapping between a first group of CMRs and a second group of CMRs. Each of the first and second groups may correspond to (or be associated with) one of the X CMR sets and/or X CMR subsets. The configuration may include/provide/specify/indicate a first bitmap. The first bitmap may provide/indicate at least one CMR pair. The CMR pair may include a CMR from the first group and another CMR from the first and/or second group. The CMR pair can be used for determining/measuring a channel quality according to (or based on) multiple CMRs (e.g., MTRP measurements). In some implementations, the configuration may include/specify a second bitmap (e.g., for single TRP transmissions and/or measurements). The second bitmap may be used to indicate/specify/provide at least one CMR from the first group and/or the second group. The at least one CMR from the first group and/or the second group can be used to determine/measure/identify a channel quality according to (or based on) a single CMR. For instance, if a resource in the second bitmap is set/configured as "1" (or other values), the resource can be used for STRP measurements. In some implementations, CMRs may not be indicated/specified by the first bitmap for pairing. The CMRs not indicated by the first bitmap for pairing can each be used for determining a channel quality according to (or based on) a single CMR. For instance, if a resource in the first bitmap is set/configured as "0" (or other values), the resource can be used for STRP measurements. In some implementations, CMRs from the first group and/or the second group may each be used for determining/measuring/identifying a channel quality. For example, all resources can be used for STRP measurements. The channel quality may be determined according to (or using) a single CMR.

In some embodiments, the first bitmap may indicate/specify/provide a number of CMR pairs (e.g., for MTRP measurements). The number of CMR pairs may be configured according to (or based on) a capability of the wireless communication device. In some implementations, the second bitmap may indicate/specify/provide a number of CMRs (e.g., for STRP measurements). The number of CMRS may be configured according to (or based on) the capability of the wireless communication device. In some implementations, a plurality of CMRs in a first group can be mapped with a respective CMR in a second group in order as CMR pairs for determining a channel quality according to (or based on) multiple CMRs. In some implementations, a number of the plurality of CMRs can be determined according to (or based on) a mapping parameter and/or a number of CMRs in the first group and a number of CMRs in the second group. In some implementations, CMRs from the first and second groups may each be used for determining/measuring/assessing a channel quality according to (or by using) a single CMR. The CMRs (e.g., from the first and second group) that are each to be used for determining a channel quality may comprise all CMRs in the first and second groups. The CMRs (e.g., from the first and second group) that are each to be used for determining a channel quality may comprise at least one CMR in the first group and/or the second group. The at least one CMR may be unmapped according to (or based on) the mapping parameter. The CMRs (e.g., from the first and second group) that are each to be used for determining a channel quality may comprise at least one CMR indicated/provided/specified by the second bitmap.

In some implementations, the wireless communication device 104 or 204 may determine/configure a respective number of CMRs in the first group. The respective number of CMRs (e.g., in the first group) may be mapped/associated/related with a respective CMR in the second group as CMR pairs. The wireless communication device 104 or 204 may determine the respective number of CMRs to be mapped in accordance with a number of CMRs configured in the first group. The wireless communication device 104 or 204 may determine the respective number of CMRs to be mapped in accordance to a number of CMRs configured in the second group by the wireless communication node 102 or 202. In some implementations, the wireless communication device 104 or 204 may receive/obtain a mode parameter from the wireless communication node 102 or 202. The wireless communication device 104 or 204 may receive the mode parameter via higher layer signaling (e.g., RRC signaling and/or MAC-CE signaling). The wireless communication device 104 or 204 may receive the mode parameter according to (or based on) a capability of the wireless communication device 104 or 204. In some implementations, the wireless communication device 104 or 204 may perform mapping/association of resources between the first group and/or the second group. The wireless communication device 104 or 204 may perform the mapping according to (or based on) a value of the mode parameter. In some implementations, the value of the mode parameter may include or correspond to a first value (e.g., mode 1, "enable", and/or "on"). If the value of the mode parameter is the first value, the wireless communication device 104 or 204 may perform mapping of CMRs between the first group and/or the second group, according to (or based on) claim 11. For instance, the wireless communication device 104 or 204 may perform mapping of CMRs by determining the respective/corresponding number of CMRs in the first group to be mapped with the respective/corresponding CMR in the second group as CMR pairs.

In some implementations, the value of the mode parameter may include or correspond to a second value (e.g., mode 2, "disable", and/or "off"). If the value of the mode parameter is the second value, the wireless communication device 104 or 204 may perform/execute mapping of CMRs between the first group and/or the second group. The wireless communication device 104 or 204 may perform the mapping of CMRs by mapping/associating every two (or other values)

CMRs from different/separate/distinct groups. The wireless communication device 104 or 204 may perform the mapping of CMRs by mapping/associating every two (or other values) CMRs from different/separate/distinct groups and/or from a same/corresponding group. In some implementations, multiple CMR pairs of resources may share/use a common CMR. If multiple CMR pairs of resources share a common CMR, other CMRs in the multiple CMR pairs may be configured with a same quasi co-location (QCL) Type-D and/or quasi co-located in QCL Type-D.

The wireless communication device 104 or 204 may perform/execute/conduct measurement of at least one CMR of the X CMR sets or the XMR subsets. The wireless communication device 104 or 204 may perform the measurement according to (or based on) the configuration. In some implementations, a CMR index with a largest measured reference signal received power (RSRP) and/or signal-to-interference-plus-noise ratio (SINR) may be reported/specified/provided first in a report group that is reported first among report groups in a report. In some implementations, each CMR index may be determined/configured by a group index of its corresponding group of CMRs (e.g., configured via higher layer signaling, such as RRC signaling and/or MAC-CE signaling). In some implementations, each CMR index may be determined/configured by its local index within the corresponding group of CMRs. In some implementations, the wireless communication device 104 or 204 may send/transmit/communicate/broadcast N reports. The N reports may comprise N measurements with best channel quality among all CMR pairs and/or single CMRs. The N reports may comprise A measurements with best channel quality among all CMR pairs. The N reports may comprise/include B measurements with best channel quality among all single CMRs. The parameters/numbers/values A and B can each be a positive integer value, and A+B=N.

The wireless communication device 104 or 204 may send/transmit/communicate a report/description. Responsive to the sending of the report, the wireless communication node 102 or 202 may receive/obtain the report. The report may include/provide/specify/indicate at least one of a CMR index, channel quality, and/or other information. In some implementations, the channel quality may comprise at least one of a reference signal received power (RSRP), signal-to-interference-plus-noise ratio (SINR) and/or channel quality information (CQI). In some implementations, the report may include/provide/specify measurement information (or other information). The measurement information may be for use by the wireless communication node 102 or 202 to configure a subsequent/following transmission. The measurement information may include/indicate/provide at least one of a number of downlink or uplink layers, a number of sounding reference signal (SRS) ports, a panel identifier (ID) of the wireless communication device and/or a case index. In some implementations, all possible combinations can be pre-configured by the wireless communication node 102 or 202 and/or reported via the capability of the wireless communication device. If the wireless communication device 104 or 204 reports/informs/provides the measurement results, only the case index may be reported (e.g., via the report). The measurement information may specify/indicate whether multiple CMRs are shared and/or received/obtained with a same panel of the wireless communication device. If multiple CMRs are shared and/or received with a same panel of the wireless communication device, a group may include up to two layers. If multiple CMRs are not shared and/or received with a same panel of the wireless communication device 104 or 204, a group may include up to four layers. In some implementations, case information (e.g., corresponding to, or associated with, the case index) may be predefined/preconfigured by the wireless communication node. The case information may be reported/communicated by a capability of the wireless communication device 104 or 204.

Supporting Multiple CMR Resource Sets/Subsets

In some network systems, the wireless communication deice 104 or 204 measures the channel according to the RS in a configured CSI-RS resource set. To enhance the application of the NCJT scenario, the network or the wireless communication node 102 or 202 can (i) configure N (N≥2) CMR resource sets for the wireless communication device 104 or 204 where each CMR resource set can be associated with a corresponding TRP, or (ii) divide a resource set into N (N≥2) CMR resource subsets. Further enhancement of the NCJT scenario calls for further reconsideration of this set/sub-set configuration. Referring to FIG. 3, the resource setting can be determined by higher-layer parameter CSI-ResourceConfig. Further, the configuration of the resource set can be determined by the parameter NZP-CSI-RS-ResourceSet. The configuration can include at least one of a repetition parameter, an aperiodic triggering offset (aperiodicTriggeringOffset) parameter and/or a tracking reference signal information (Trs-info) parameter. Configuring multiple CMR resource sets/sub-sets in one resource setting/resource set calls for reconsideration of at least the repetition parameter, the aperiodic triggering offset (aperiodicTriggeringOffset) parameter and/or the tracking reference signal information (Trs-info) parameter. The configuration of CMR resources can be determined by the parameter NZP-CSI-RS-Resource. The configuration can include a periodicity and offset (periodicityAndOffset) parameter which defines the CMR periodicity and slot offset for periodic/semi-persistent CSI-RS. All the CMRs from X CMR resource sets or X CMR resource subsets can be configured with the same periodicity, while the slot offset can be same or different for different CMR resources.

With regard to the parameter repetition, if the corresponding field (in the configuration received by the UE) is set to off or is absent, the wireless communication device 104 or 204 may not assume that the NZP-CSI-RS resources within the CMR resource set are transmitted with the same downlink spatial domain transmission filter. The parameter repetition of each CMR resource set/sub-set can be set to the same or different value.

With respect to the aperiodicTriggeringOffset parameter, the wireless communication node 102 or 202 can transmit an offset q between the slot containing the DCI that triggers a set of aperiodic NZP CSI-RS resources and the slot in which the CSI-RS resource set to the wireless communication device 104 or 204. In the SDCI based MTRP scenario, different offsets are to be configured for each set/sub-set to avoid collision. For the MDCI based MTRP scenario, the aperiodicTriggeringOffset parameter can be the same or different across different CMR resource sets/subsets.

The Trs-info parameter can indicate that the antenna port for all NZP-CSI-RS resources in the CSI-RS resource set is the same. The parameter Trs-Info can be the same or different across the CMR resource sets/subsets. In the configuration example below, the nzp-CSI-RS-ResourceSetList can include or refer to configuration parameters for multiple CMR resource sets/subsets. The dashed box below represents a group of configuration parameters for a single CMR resource set/subset, and the nzp-CSI-RS-ResourceSetList can include or refer to multiple groups of configuration parameters for multiple CMR resource sets/subsets.

| NZP CSI Resource set |
|---|

```
                              NZP-CSI-RS ResourceSet:: = SEQUENCE {
                                nzp-CSI-ResourceSetId
CSI-ResourceConfig ::= SEQUENCE {  nzp-CSI-RS-Resources
  csi-ResourceConfigId             repetition              { on, off }
  csi-RS-ResourceSetList CHOICE {  aperiodicTriggeringOffset (0..6)
    nzp-CSI-RS-SSB SEQUENCE {      trs-info                {true}
      nzp-CSI-RS-ResourceSetList ⟶ ...,
      csi-SSB-ResourceSetList      [[
    }                              aperiodicTriggeringOffset-r16 INTEGER(0..31)
  },                               ]]
                                 } csi-IM-ResourceSetList
  bwp-Id BWP-Id,
  resourceType ENUMERATED aperiodic, semiPersistent, periodic},
  ...
}
```

Configuring Parameters for Various CMR Resource Sets/Subsets

The wireless communication node may support or use one or more methods/processes for configuring parameters of the CMR resource sets/subsets. According to a first configuration method/process, the wireless communication node 102 or 202 or the network can configure, for each CMR resource set/subset, a separate/corresponding set of RRC parameters, and send/transmit/communicate/broadcast the configured sets of RRC parameters to the wireless communication device 104 or 204. Accordingly, the wireless communication device 104 or 204 can receive a separate set of configuration parameters, or a separate set of RRC parameters, (e.g., denoted as NZP-CSI-RS-ResourceSet) for each of the X CMR resource sets or the X CMR resource subsets.

For example, the network or the wireless communication node 102 or 202 can configure/define the following sets of configuration/RRC parameters:

| Set 1 |
|---|
| NZP-CSI-RS-ResourceSet ::= SEQUENCE {<br>    nzp-CSI-ResourceSetId 1<br>    nzp-CSI-RS-Resources<br>    repetition    { off }<br>    aperiodicTriggeringOffset    (2)<br>    trs-Info    {true}<br>} |

| Set 2 |
|---|
| NZP-CSI-RS-ResourceSet ::=    SEQUENCE {<br>  nzp-CSI-ResourceSetId 2<br>  nzp-CSI-RS-Resources<br>  repetition    { off }<br>  aperiodicTriggeringOffset    (4)<br>  trs-Info    {true}<br>} |

As can be seen from the example above, all the parameters (nzp-CSI-ResourceSetId, nzp-CSI-RS-Resources, repetition, aperiodicTriggeringOffset and trs-Info) are configured/indicated under each set according to corresponding requirement, no matter whether their values are the same or different across different CMR resource sets/subsets. In general, and regardless of the configuration method/process used, the configuration received by the wireless communication device 104 or 204 can include a plurality of configurations parameters with each parameter being for, or corresponding to, one or more of the X CMR resource sets or the X CMR resource subsets. Each of the plurality of parameters can be set to the same value across various CMR resource sets/subsets (e.g., across the X CMR resource sets/subsets). In some implementations, each (or at least one) of the plurality of parameters can be set to different values across different CMR resource sets and/or CMR resource subsets.

According to a second configuration method/process, the wireless communication node 102 or 202 or the network can configure the configuration/RRC parameters having the same value across various CMR resource sets/subsets in a single set of configuration/RRC parameters, and configure configuration/RRC parameters with different values across various CMR resource sets/subsets in each set of configuration/RRC parameters. The wireless communication node 102 or 202 can associate these sets of configuration/RRC parameters (or reference the set including the parameter(s) with the same value(s) across various CMR resource sets) by a parameter, e.g., denoted as Setassociation-r17. As an example, the wireless communication node 102 or 202 can configure/define the following sets of configuration/RRC parameters (corresponding to different CMR resource sets) and send/transmit/broadcast/communicate them to the wireless communication device 104 or 204.

| Set 1 |
|---|
| NZP-CSI-RS-ResourceSet :=    SEQUENCE {<br>  nzp-CSI-ResourceSetId    1<br>  nzp-CSI-RS-Resources<br>  repetition    { off }<br>  aperiodicTriggeringOffset    (2)<br>  trs-Info    {true}<br>} |

| Set 2 |
|---|
| NZP-CSI-RS-ResourceSet ::=    SEQUENCE {<br>  nzp-CSI-ResourceSetId 2<br>  nzp-CSI-RS-Resources<br>  aperiodicTriggeringOffset    (4)<br>  Setassociation-r17    nzp-CSI-ResourceSetId 1<br>} |

As depicted in the above example, one group of parameters (repetition and trs-Info) is not configured in set 1 but not in set 2, because these parameters have the same value (or are configured in the same way) in both sets. The group of parameters can be shared across other sets of parameters (e.g., set 2) by referencing set 1 where they are included/indicated. Other parameters (those configured differently across various CMR resource sets) can only apply to corresponding CMR resource set/subset.

In the case where the wireless communication device 104 or 204 is configured with a plurality of CMR resource sets/subsets, when the wireless communication device 104 or 204 finds that some parameters are missing in a given set of configuration/RRC parameters (e.g., set 2), the wireless communication device 104 or 204 can search for the missing parameters in another set of configuration/RRC parameters (e.g., set 1). The wireless communication device 104 or 204 can identify the other set of configuration/RRC parameters (e.g., set 1) as the set associated with the high level parameter SetAssociation-r17. Specifically, sets of configuration/RRC parameters with some of the parameters missing can include the parameter SetAssociation-r17 to indicate, reference or point to the set of configuration/RRC parameters where the missing parameters can be found/obtained. This approach allows for avoiding, or at least mitigating/reducing, redundant transmission of the same information between the wireless communication node 102 or 202 and the wireless communication device 104 or 204, and therefore leads to a more efficient use of the bandwidth.

According to the second configuration method/process, the wireless communication device 104 or 204 can receive a first set of RRC parameters associated with a first CMR resource set of the X CMR resource sets or with a first CMR resource subset of the X CMR resource subsets to be applied to at least one of the X CMR resource sets or the X CMR resource subsets, and receive, for each of the X CMR resource sets or X CMR resource subsets, a second set of RRC parameters to be applied to a corresponding CMR resource set or a corresponding CMR resource subset. The first set of RRC parameters can refer to the parameters having the same value(s) across various CMR resource sets/subsets, whereas the second set of RRC parameters can refer to the parameters having the different values across various CMR resource sets/subsets. The wireless communication device 104 or 204 can receive a reference parameter to indicate one or more values of the first set of RRC parameters to be applied to the X CMR resource sets or the X CMR resource subsets.

A third configuration method/process relates to the case where all the configuration/RRC parameters are the same across all X CMR sets/subsets. According to a first approach of the third configuration method/process, the wireless communication node 102 or 202 can configure/define a single set of configuration/RRC parameters (for all X CMR resource sets/subsets), which includes a parameter that directly divides resources into CMR resource sets/subsets. The parameter can indicate how the CMR resources are split/distributed among various CMR resource sets/subsets. For example, the wireless communication node 102 or 202 can configure/define the single set of configuration/RRC parameters as:

---
Set 1
---
NZP-CSI-RS-ResourceSet ::=    SEQUENCE {
  nzp-CSI-ResourceSetId
  nzp-CSI-RS-Resources -continued ---
Set 1
---
  repetition                  { off }
  aperiodicTriggeringOffset               (2)
  trs-Info                    {true}
  Resource Division           {on, off}
  Resource Division Mode      {0, 1, 2, ... }
}

The Resource Division parameter can be used to indicate whether to divide CMR resources into subsets. The Resource Division parameter may indicate whether to divide CMR resources into subsets. If it set to on, the wireless communication device 104 or 204 can divide CMR resources into the X CMR resource sets/subsets according to a default method. For example, the first half belongs to a first set CMR resource set/subset, and the other half belongs to a second CMR resource set. More generally, the wireless communication device 104 or 204 can divide/split the CMR resources according to any predefined default method (e.g., into any predefined number of CMR resource sets/subsets. If the parameter is set to off or does not exist, it is the same as 3GPP Release 16.

The Resource Division Mode parameter can be used to indicate a resource division mode or division method among a plurality of division modes/methods. For example, if it set to 0, the first half of the resources can belong to a first CMR resource set/subset and the other half can belong to a second CMR resource set/subset (assuming a total of two CMR resource sets/subsets). If it set to 1, resources with an odd index can belong to the first CMR resource set/subset, and resources with an even index can belong to the second set/subset (assuming a total of two CMR resource sets/subsets). It is to be noted that these example modes are provided for illustrative purposes and the wireless communication node 102 or 202 can configure/set/define different modes and/or a different total number (e.g., X) CMR resource sets/subsets.

The wireless communication node 102 or 202 can use/configure only one or both of the Resource Division parameter and the Resource Division Mode parameter. When using, defining or configuring both parameters, the wireless communication node 102 or 202 can use them in a non conflicting way.

According to a second approach of the third configuration method/process, the wireless communication node 102 or 202 can configure/define a single set of configuration/RRC parameters (for all X CMR resource sets/subsets), which includes a parameter that directly configure another resource subset. For example, the wireless communication node 102 or 202 can configure the set of configuration/RRC parameters as follows:

NZP-CSI-RS-ResourceSet ::=    SEQUENCE {
  nzp-CSI-ResourceSetId
  nzp-CSI-RS-Resources
  nzp-CSI-RS-Resources-r17
  repetition                  { off }
  aperiodicTriggeringOffset               (2)
  trs-Info                    {true}
}

The nzp-CSI-RS-Resources parameter can be used to configure CMR resources for the first subset, and the nzp- CSI-RS-Resources-r17 parameter can be used to configure CMR resources for the second subset. Other parameters may apply to both of the two subsets. According to this second approach of the third configuration method process, the wireless communication device 104 or 204 can receive X CMR resource lists, where each of the X CMR resource lists corresponds to a CMR resource subset. The wireless communication device 104 or 204 can receive, for each CMR resource list of the X CMR resource lists, a corresponding parameter indicative of the CMR resource list. For instance, the wireless communication node 102 or 202 can configure various parameters, such as nzp-CSI-RS-Resource-r17-1, nzp-CSI-RS-Resource-r17-2, . . . , nzp-CSI-RS-Resource-r17-(n–1), to indicate n–1 additional (e.g., in addition to a first CMR resource subset) CMR resource subsets.

Selection of CMR Resource Sets Subset for Beam or Channel Measurement

For aperiodic CSI-RS resource setting, the wireless communication node 104 or 204 can configure S>2 CMR resource sets (or multiple periodic/semi-persistent resource sets). The wireless communication device 104 or 204 can use a selection method (e.g., among multiple selection methods) to select CMR resource sets used for beam measurement or channel quality measurement.

According to a first selection method/process/approach (denoted as RRC configuration approach), the wireless communication node 102 or 202 can configure an RRC parameter under a set of CMR resources to indicate whether the set is used for (contributing 1 CMR to a CMR pair for) CMR pair selection. Another set of CMR resources would contribute another CMR to form the CMR pair. For example, the wireless communication node 102 or 202 can configure the RRC parameter as follows:

```
NZP-CSI-RS-ResourceSet ::=    SEQUENCE {
  nzp-CSI-ResourceSetId 1
  nzp-CSI-RS-Resources
  nzp-CSI-RS-Resources
  repetition                  { off }
  aperiodicTriggeringOffset              (2)
  trs-Info                    {true}
  groupBasedBeamMeasurement         {on}
}
```

The groupBasedBeamMeasurement parameter, e.g., when set to on, can indicate that the corresponding CMR resource set/subset is to contribute a CMR to a CMR pair. The wireless communication device 104 or 204 can select the X CMR resource sets/subsets from Y CMR resource sets/subsets using RRC signaling (e.g., the groupBasedBeamMeasurement parameter), where Y is an integer greater than X. The groupBasedBeamMeasurement parameter may just inform or indicate to the wireless communication device 104 or 204 that the corresponding set/subset is selected to contribute a CMR to a CMR pair. The wireless communication device 104 or 204 can be further notified/informed of a resource from the CMR resource set/subset according to one or more rules (e.g., as discussed with regard to FIGS. 4-7) to make a CMR pair with another resource from another selected CMR resource set/subset.

According to a first selection method/process/approach (denoted as Bitmap dynamic selection), the wireless communication node 102 or 202 can configure and send (e.g., in DCI) a bitmap to the wireless communication device 104 or 204 to indicate/two or more sets from all configured sets, for CMR pair selection (e.g., as discussed above with regard to FIGS. 4-7). The wireless communication device 104 or 204 can select the X CMR resource sets/subsets from Y CMR resource sets/subsets using the bitmap received from the wireless communication node 102 or 202, where Y is an integer greater than X.

A third selection method/process/approach, referred to herein as RRC and bitmap selection, the wireless communication node 102 or 202 can use one or more RRC parameters to configure some CMR resource sets that can be used for selecting a CMR pair, and use a bitmap to indicate a selection among the CMR resource sets configured via the RRC parameter. The wireless communication device 104 or 204 can first select Z CMR resource sets/subsets from Y CMR resource sets/subsets using RRC signaling (e.g., the groupBasedBeamMeasurement parameter), where Y is an integer greater than Z. The wireless communication device 104 or 204 can then select the X CMR resource sets/subsets from the Z CMR resource sets/subsets using a bitmap received from the wireless communication node 102 or 202, where Z is an integer greater than X.

Beam Failure Recovery

In a cell, if the wireless communication device 104 or 204 calculates/determines the link quality based on beam failure detecting reference signal resource set (BFD-RS set) being worse than a predefined threshold, the wireless communication device 104 or 204 can record the event as a beam failure instance. When the wireless communication device 104 or 204 detects the number of beam failure instances to be equal to or greater than a corresponding threshold, the wireless communication device 104 or 204 can confirm beam failure in the cell. This cell can be called or referred to as failed cell. If the failed cell is configured for one link, the wireless communication device 104 or 204 can confirm beam failure on the link, and the link can be called or referred to as failed link.

When the wireless communication device 104 or 204 detects the beam failure, wireless communication device 104 or 204 will try to find a new beam from new candidate beam indication reference signal resource set (NBI-RS set) with corresponding L1-RSRP measurements that are larger than or equal to a predefined threshold. For the beam failure recovery, after the wireless communication device 104 or 204 receives response from the wireless communication node 102 or 202 within a period of time, the wireless communication device 104 or 204 can apply the new beam for PDCCH monitoring or PUCCH transmitting.

In some network systems, a period of time to apply a new beam to a signal for a single TRP (link) can be 28 symbols from a last symbol of a PDCCH reception with a DCI format scheduling a PUSCH transmission with a same HARQ process number as for the transmission of the first PUSCH and having a toggled NDI field value. The 28-symbols' period can be based on the smallest SCS of the response receiving cell and the failed cell. The above described approach addresses beam failure recovery for a single TRP (link). For MTRP, beam failure recovery is more complicated and the above approach would not be operable. For instance, when there is more than one failed TRPs (links), some failed cells may be associated with a first TRP (link), and some other failed cells may be associated with a second TRP (link). In such case, the wireless communication device 104 or 204 would not know how to calculate/determine the 28 symbols (or, in general, the time period during which to wait before applying the new beam). According to example implementations, the wireless communication device 104 or 204 can determine the 28 symbols according to any/one of the following options.

Option 1: Determining SCS of 28 symbols is per failed cell/failed cell group of all failed TRPs (links) (i.e., based on the smallest SCS of the response receiving cell and a respective failed cell).

Option 2: Determining SCS of 28 symbols is based on the smallest SCS of the response receiving cell and all failed cells/failed cell group of all failed TRPs (links).

Option 3: Determining SCS of 28 symbols is based on the smallest SCS of the response receiving cell and all failed cells/failed cell group of per failed TRP (link)

For MTRP, a TRP (link) can be performed/defined/configured according to any of the following options:

Option 1: different values of CORESETpoolIndex.
Option 2: different BFD-RS/NBI-RS set.
Option 3: with different TRP-ID.

FIG. 10 shows a flowchart illustrating a method 1000 for beam failure recover, according to example embodiments of the current disclosure. In overview, the method 1000 can include the wireless communication device 104 or 204 applying a new beam to a signal after 28 symbols from a last symbol of a physical downlink control channel (PDCCH) reception, according to a smallest subcarrier spacing of a response receiving cell and at least a first cell (STEP 1002).

In some implementations, the at least a first cell can include at least one of each failed cell or all failed cells. The wireless communication device can determine a cell of the at least a first cell to be a failed cell by detecting one or more beam failures each of which is detected based on a beam failure detecting reference signal resource set (BFD-RS set) configured on the cell for a link. The all failed cells can be associated with a same link. The link can include at least one of CORESETpoolIndex, transmission reception points (TRP), beam failure detecting reference signal resource set (BFD-RS set) or TRP-ID.

In some implementations, the new beam can include a reference signal (RS) from a new candidate beam indication reference signal resource set (NBI-RS set) with corresponding link quality that is larger than or equal to a threshold. The signal can include at least one of PDCCH monitoring using a same antenna port quasi co-location parameters as the RS, or PUCCH transmitting, using a same spatial domain filter as the RS.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
   identifying, by a wireless communication device, a new beam including a reference signal (RS) from a new candidate beam indication reference signal resource set (NBI-RS set) with corresponding link quality that is larger than or equal to a threshold; and
   applying, by the wireless communication device, the new beam to a signal after 28 symbols from a last received symbol of a physical downlink control channel (PDCCH), according to a smallest subcarrier spacing of a response receiving cell and at least a first cell.

2. The method of claim 1, wherein the at least a first cell comprises at least one of:
   each failed cell, or
   all failed cells.

3. The method of claim 2, wherein a cell of the at least a first cell is determined to be a failed cell upon the wireless communication device detecting one or more beam failures each of which is detected based on a beam failure detecting reference signal resource set (BFD-RS set) configured on the cell for a link.

4. The method of claim 3, wherein the link comprises at least one of:
   CORESETpoolIndex;
   one or more transmission reception points (TRPs);
   beam failure detecting reference signal resource set (BFD-RS set); or
   one or more identifiers (IDs) of the one or more TRPs.

5. The method of claim 2, wherein the all failed cells are associated with a same link.

6. The method of claim 1, wherein the signal comprises at least one of:
   PDCCH monitoring, using a same antenna port quasi co-location parameters as the RS, or
   physical uplink control channel (PUCCH) transmitting, using a same spatial domain filter as the RS.

7. A wireless communication device comprising:
   at least one processor configured to:
   identify a new beam including a reference signal (RS) from a new candidate beam indication reference signal resource set (NBI-RS set) with corresponding link quality that is larger than or equal to a threshold; and
   apply the new beam to a signal after 28 symbols from a last received symbol of a physical downlink control channel (PDCCH), according to a smallest subcarrier spacing of a response receiving cell and at least a first cell.

8. The wireless communication device of claim 7, wherein the at least a first cell comprises at least one of:
   each failed cell, or
   all failed cells.

9. The wireless communication device of claim 8, wherein a cell of the at least a first cell is determined to be a failed cell upon the wireless communication device detecting one or more beam failures each of which is detected based on a beam failure detecting reference signal resource set (BFD-RS set) configured on the cell for a link.

10. The wireless communication device of claim 9, wherein the link comprises at least one of:
    CORESETpoolIndex;
    one or more transmission reception points (TRPs);
    beam failure detecting reference signal resource set (BFD-RS set); or
    one or more identifiers (IDs) of the one or more TRPs.

11. The wireless communication device of claim 8, wherein the all failed cells are associated with a same link.

12. The wireless communication device of claim 7, wherein the signal comprises at least one of:
    PDCCH monitoring, using a same antenna port quasi co-location parameters as the RS, or
    physical uplink control channel (PUCCH) transmitting, using a same spatial domain filter as the RS.

13. A non-transitory computer readable medium storing instructions, which when executed by at least one processor, cause the at least one processor to:
    identify a new beam including a reference signal (RS) from a new candidate beam indication reference signal resource set (NBI-RS set) with corresponding link quality that is larger than or equal to a threshold; and
    apply the new beam to a signal after 28 symbols from a last received symbol of a physical downlink control channel (PDCCH), according to a smallest subcarrier spacing of a response receiving cell and at least a first cell.

14. The non-transitory computer readable medium of claim 13, wherein the at least a first cell comprises at least one of:
    each failed cell, or
    all failed cells.

15. The non-transitory computer readable medium of claim 14, wherein a cell of the at least a first cell is determined to be a failed cell upon the wireless communication device detecting one or more beam failures each of which is detected based on a beam failure detecting reference signal resource set (BFD-RS set) configured on the cell for a link.

16. The non-transitory computer readable medium of claim 15, wherein the link comprises at least one of:

CORESETpoolIndex;
one or more transmission reception points (TRPs);
beam failure detecting reference signal resource set (BFD-RS set); or
one or more identifiers (IDs) of the one or more TRPs.

17. The non-transitory computer readable medium of claim 14, wherein the all failed cells are associated with a same link.

\* \* \* \* \*